UNITED STATES PATENT OFFICE.

CARLETON ELLIS, OF MONTCLAIR, NEW JERSEY.

NICKEL FORMO-CARBONATE AND PROCESS OF MAKING SAME.

1,390,686. Specification of Letters Patent. Patented Sept. 13, 1921.

No Drawing. Application filed April 28, 1919. Serial No. 293,179.

*To all whom it may concern:*

Be it known that I, CARLETON ELLIS, a citizen of the United States, and a resident of Montclair, in the county of Essex and State of New Jersey, have invented certain new and useful Improvements in Nickel Formo-Carbonate and Processes of Making Same, of which the following is a specification.

This invention relates to a method of making nickel formate and other formate-containing bodies or mixtures which are adapted for use in yielding a catalyzer for the hydrogenation of oils and also includes a method of regenerating spent catalytic material.

When nickel formate of the requisite quality is heated in oil to about 240° C. a catalyzer is obtained which is very useful in hydrogenating fatty oils.

According to the present invention nickel formate is produced which is of such a character that it may be employed in a satisfactory manner for such hydrogenation purposes.

The present invention contemplates the production of nickel formate (or the formates of other metals having catalytic properties such as cobalt and allied metals) which may contain impurities but not of a character which would sensibly influence the catalytic activity of the nickel produced therefrom when the nickel formate is heated to 200–240° C. in the reducing operation. In lieu of a single metallic formate, double or complex formates may likewise be prepared, such as nickel-copper formates. Another modification is a composite containing nickel carbonate and formate. It is commonly supposed that sulfur or sulfur compounds in its or their various forms act as poisons for catalyzers but I have observed when using sulfates, if care is taken in the reduction the effect if anything is the contrary, that is, the presence of the sulfur in the form of sulfates is not harmful and hence in the present invention I may make use of catalyzers of the nickel type in conjunction with sulfates, formerly regarded as catalyzer poisons. Further it has been supposed that the continued use in hydrogenation of oils of a catalyzer containing sulfur compounds would bring about rapid deterioration, due to the formation of nickel sulfid. At ordinary hardening temperatures however, of say 160–180° C. this action, if present, is but very slightly apparent and in fact is much less noticeable than the poisoning action brought about by impurities in many of the oils which are hardened. The present invention in one form includes a product consisting of nickel formate or similar material incorporated with a soluble or insoluble sulfate preferably present in substantial amount. Similarly sodium phosphate or other soluble salts, which are not reduced by hydrogen at working temperatures, may be present, or other salts which serve in a similar manner and do not exert a sensibly toxic action on the catalyzer. To recover such a catalyzer after its activity is spent, by simply boiling in water the soluble salts dissolve, the oil comes to the surface and a large part of the nicked settles to the bottom. The procedure of the present invention may illustratively take the following form: A solution of calcium formate is mixed with a solution of nickel sulfate (using equivalent proportions) to yield nickel formate and calcium sulfate. Such portion of the latter as separates may be filtered off if desired but preferably the solution containing all the calcium sulfate is evaporated to dryness and ground to a fine powder.

In place of reacting on the raw materials in the form of their solutions the nickel sulfate and sodium or calcium formate in the dry state may be mixed and preferably ground together and heated if desired. Preferably the dry mixture of nickel sulfate and calcium formate is slightly moistened to bring about reaction and this mass then dried. In this way the use of bulky solutions and the evaporation of considerable quantities of water is avoided.

In another case nickel sulfate may be precipitated by sodium carbonate employing dilute or concentrated solutions either cold or hot in which to carry out the precipitation, the temperature of the solution tending to modify the character of the precipitate to a greater or less degree. The solution is put through a filter press and the cakes of nickel carbonate with adhering sodium sulfate, etc., may be treated directly with an equivalent amount of formic acid to produce nickel formate.

A method of preparing a mixture of sodium sulfate and nickel carbonate is as follows: 13 parts by weight of nickel sulfate ($6H_2O$) and 8.4 parts sodium bicarbonate were ground together and 6 parts of water were added. This formed a thin paste which gave off carbon dioxid gas in large quantities and became expanded to a porous pasty material which on further standing solidified to a porous mass. On moistening granules of this material with formic acid and drying, a formate mixture is obtained. The proportion of formic acid may vary to yield neutral, acid or basic compounds.

As stated in Serial No. 227,889, nickel formate may be prepared by dissolving nickel hydrate in formic acid, drying carefully, and grinding to a powder or the formate may be prepared from spent catalyzer by dissolving the nickel residues in formic acid. As stated above and as appears in Serial No. 165,763, nickel formate may be prepared by dissolving nickel carbonate in formic acid. The freshly precipitated carbonate or hydrate is more effective in yielding a salt of the character desired. Acid, basic and neutral compounds of formic acid may be produced, the preferable one being the neutral formate.

As formic acid is comparatively expensive a product may be prepared from nickel carbonate by partial reaction with formic acid which is substantially cheaper but which however, decomposes readily on heating to give metallic nickel or other nickel material suitable as a catalyzer. For instance by half neutralization of nickel carbonate a product is obtained which may be considered either as a mixture of equivalent proportions of nickel carbonate and nickel formate or as a double compound of nickel carbonate and formate which may be termed a formo-carbonate. To illustrate, nickel carbonate is prepared as a moist precipitate and is treated with formic acid. Approximately one-half the amount of formic acid is added that would completely convert the carbonate into the normal formate. Thus the product which is herein termed a formo-carbonate is obtained. While the ratio of nickel carbonate to nickel formate is preferably on the basis of equal molecular proportions there may be more or less variations according to the conditions of use, etc. With the product of equal molecular proportions on heating in oil to the decomposition point reaction may be expected to take place in part at least in accordance with the following equation:

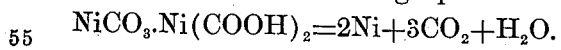
$$NiCO_3 \cdot Ni(COOH)_2 = 2Ni + 3CO_2 + H_2O.$$

Thus the catalytic material is obtained with only half the amount of formic acid required when nickel formate of a normal character is employed. In a similar manner the formo-carbonate of cobalt or of nickel and cobalt, copper and other metals may be prepared and used to form catalytic material.

Nickel carbonate may be prepared by treating nickel sulfate with sodium carbonate or calcium carbonate and this product partially converted with formic acid to produce formo-carbonate of nickel admixed with sulfates of sodium or calcium respectively. Such a mixture may be directly heated in oil to yield catalytic material or the heating of the formo-carbonate in any of its modifications may be carried out in a drum or tube to yield catalytic material in a dry form.

A further modification of the product is that obtainable by treating nickel carbonate with a mixture of formic and acetic acids. For example equal molecular parts of these acids are employed and the amount of the mixed acid used is not sufficient to completely convert the carbonate into the salts of these acids for example a half conversion may be brought about.

In place of using nickel carbonate it is possible in some cases to employ nickel hydrate. For example nickel sulfate is treated with a solution of sodium hydroxid to produce nickel hydrate and sodium sulfate. This may be washed to remove the sulfate or other soluble salts completely or incompletely. Preferably a product containing some sulfate is treated with formic acid using one-half the amount of the latter acid required for complete conversion. On heating, reaction takes place, and by evaporating to dryness a product is obtained which when ground to a powder may be heated by the dry or the wet process to yield catalytic material.

In treating nickel carbonate with the full amount or even an excess of formic acid I have noted that a part of the carbonate usually dissolves with relative ease while it is difficult to bring the residue of the carbonate into solution. It is possible that a portion of the carbonate is in a hydrated and basic condition capable of comparatively easy solution in formic acid while another portion which corresponds merely to a true normal carbonate is more resistant to solution. In any event the partial treatment with formic acid overcomes the difficulty attendant on the attempt to completely dissolve the carbonate and at the same time furnishes catalytic material which decomposes in oil in a highly satisfactory manner with utilization from the catalytic standpoint of a substantially large amount of nickel than corresponds to the actual proportion of normal nickel formate present.

In its simplest form the invention may be illustrated by the production of normal nickel formate. To this end nickel sulfate is placed in solution and a slight excess of sodium carbonate solution is added to precipitate nickel carbonate. If the presence of a large amount of sodium sulfate would be objectionable in the finished catalyzer owing to its having too great a bulking effect, the precipitate of nickel carbonate may be washed to such a stage of purity as is desired. This is preferably done in a filter press using hot water. The press cake of nickel carbonate is then placed in earthenware or glass-lined vessels and heated with a slight excess of formic acid. During this heating water may be added to keep the contents in the form of a thin or thick paste. When the nickel carbonate has dissolved as completely as possible the solution may be filtered if desired and evaporated to dryness. The crystalline nickel formate obtained may be further dried, care being taken to avoid blackening which will occur if the material is dried at too high a temperature, a gentle heat around 50 or 60° C. if preferable. The product may then be put through a ball mill or other form or grinder to convert to a fine powder. This yields nickel formate free from or containing sulfates, free from iron and also free from impurities which would be direct catalyzer poisons under the conditions of reduction involved.

The regeneration of the catalytic material may be carried out by dissolving the spent catalyzer, (preferably previously extracted with gasolene, benzol, etc., to remove fats,) in nitric acid and precipitating with sodium carbonate or caustic soda solution to yield a carbonate or hydrate and then reacting upon the moist precipitate with formic acid or acetic acid and the like or a mixture of these acids. It is not necessary in all cases to act upon the wet precipitate. Freshly precipitated nickel hydrate may be dried but in such case it is desirable to carry out the drying so as to not contract the nickel hydrate particles in such a way as to interfere with their ready solution in the acids mentioned.

When using iron tanks, iron pipes, etc., in hydrogenating apparatus enough iron is taken up by the catalyzer to contaminate it to a considerable degree. Hence the presence of iron in the nickel formate obtained from spent catalyzer. Any substantial amount of iron in the formate may not only tend to discolor the oil but also may impede the activity or longevity of the catalyzer.

Finally it may be stated that the process involved herein in its specific aspects calls for the production of nickel hydrate or preferably nickel carbonate preferably in freshly precipitated condition and treating this material with formic acid preferably out of contact with iron as the latter is objectionable in the formate whereby a nickel salt of formic acid is obtained and preferably a neutralizing or expelling any excess of formic acid in order to yield the neutral salt. Finally the product is dried, care being employed to prevent blackening of the material. The product should be free from cataylzer poisons or impurities that decompose with the production of poisons by heating to 240° C. The product is in the form of a light green powder although it may be produced in some cases in the crystalline form. As a powder better results are obtained in heating in oil as the finely divided nickel formate breaks down to better advantage.

In its broader aspects the invention includes the preparation of nickel or other metal formate or composites containing formate, preferably by reacting on a basic metallic compound such for example as nickel hydrate or on a carbonate or basic carbonate such for example as those of nickel or nickel and cobalt with a reagent containing formic acid, varying the amount of the acid to produce acid, neutral or basic salts as desired; and in carrying out the operation to eliminate from the material or to prevent its inclusion of substances with are truly catalyzer poisons under the conditions of decomposition of the formate material. Thus such elements as free sulfur or free phosphorus are objectionable, while in their oxidized forms as sulfate or phosphates their presence may be actually beneficial. Another element which preferably should be absent is iron as this material when present in any substantial amount may either interfere with the catalytic action or enter into solution in the oil which is being hydrogenated thereby discoloring the latter to an objectionable degree. The present invention also contemplates the production of a simple formate such as acid, basic or neutral nickel formate in a state of purity so far as actual catalyzer poisons are concerned but not necessarily free from substances which act as catalyzer poisons when reduction of nickel takes place in their presence at temperatures of 500 to 600° C.

It may be noted that the atomic weight of nickel is 58.7, that of cobalt is 59 and that of copper is 63.6. Likewise that of phosphorus is 31 and that of sulfur is 32.

The production of catalyzers *per se* containing sulfate or phosphate as herein described is not specifically claimed herein, but in my co-pending applications 236,669, filed May 27, 1918, and 276,869, filed Feb. 23, 1919, being a renewal of Serial No. 808,461, filed Dec. 23, 1913.

What I claim is:—

1. The process of making nickel formo-carbonate which comprises reacting on freshly precipitated nickel carbonate with an amount of formic acid insufficient to completely convert the carbonate to the formate and in converting the product into a dry powder.

2. As a new catalytic raw material nickel formo-carbonate.

3. As a new form of catalytic raw material a composition containing nickel carbonate and formate, together with a compound of a metalloid element having an atomic weight between about 31 and about 32.

4. The process of making nickel formo-carbonate which comprises reacting on nickel carbonate with formic acid in an amount insufficient to completely convert the carbonate into the formate.

5. The process of making nickel formo-carbonate which comprises reacting on nickel carbonate with about one-half the chemically equivalent amount of formic acid and in drying the product.

6. The process of making a material suitable for the production of catalyzers which comprises reacting upon a carbonate of a metal having an atomic weight between 58.7 and 63.6, with substantially less than the chemically-equivalent amount of a lower fatty acid, to produce a compound of such metal with such fatty acid and with carbonic acid.

7. As a new material suitable for the production of catalyzers, a double compound of a carbonate and a lower fatty acid salt of a metal having an atomic weight between 58.7 and 63.6.

8. A process of making a double salt of nickel which comprises reacting on nickel carbonate with a lower fatty acid in an amount insufficient to completely convert the carbonate into the normal salt of such fatty acid.

9. A product containing a formo-carbonate of a metal having an atomic weight between 58.7 and 63.6 and containing a sulfate.

10. A product containing a formo-carbonate of a metal having an atomic weight between 58.7 and 63.6 and containing a non-poisoning compound of a metalloid element with an atomic weight between about 31 and 32.

11. As a new material suitable for the production of catalyzers, a double compound of carbonate and a lower fatty acid salt of a metal having an atomic weight between 58.7 and 63.6, such material containing also a non-poisoning compound of a metalloid element having an atomic weight of about 31 to 32.

CARLETON ELLIS.